Sept. 12, 1939.     H. H. HARRIS     2,172,376
ROLLER UNIT
Filed Nov. 12, 1937
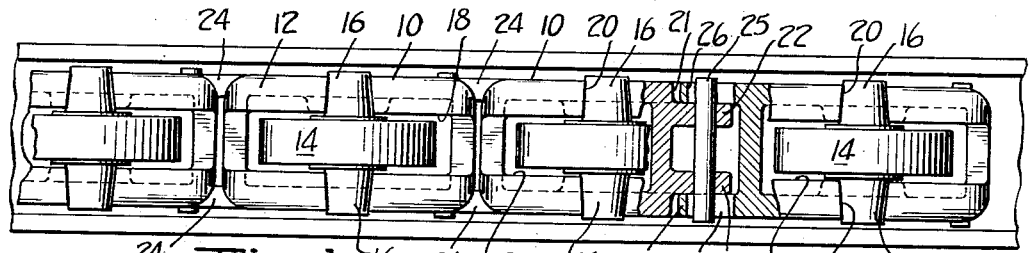
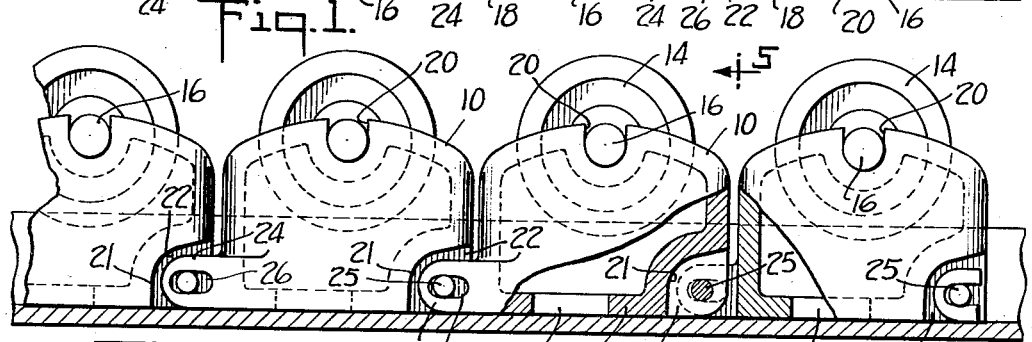
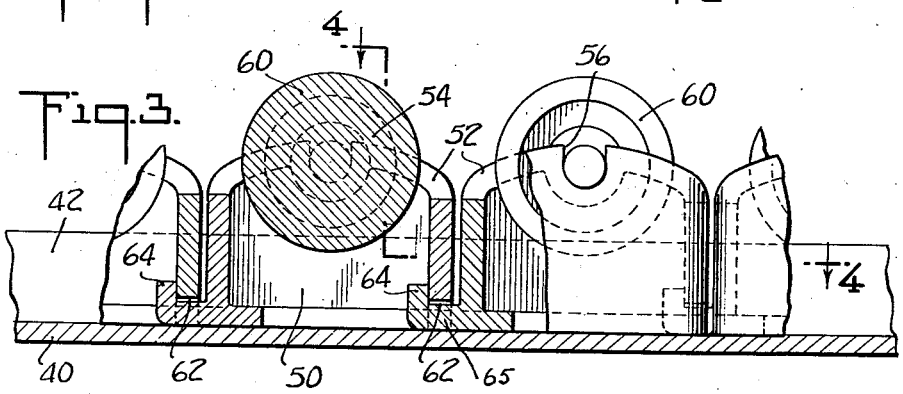
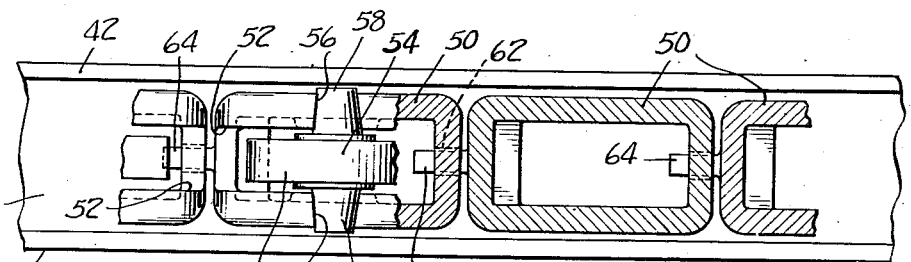
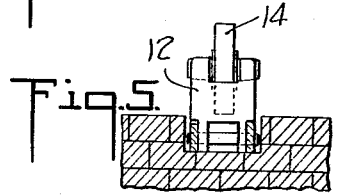
INVENTOR
Henry H. Harris
BY
Dyke and Schaives
ATTORNEYS Patented Sept. 12, 1939

2,172,376

UNITED STATES PATENT OFFICE 2,172,376

ROLLER UNIT

Henry H. Harris, Champaign, Ill.

Application November 12, 1937, Serial No. 174,160

3 Claims. (Cl. 193—35)

My invention relates generally to industrial heat treating furnaces, and specifically relates to the means employed within such furnaces over which the supports, such as trays, boxes and the like, carrying the work being treated are moved through the furnace. Various means, such as skid rails, trapped balls, certain types of roller rails, and the like, have been used for such purposes, but have proven unsatisfactory for one reason or another, such as high initial cost, failure in operation, upkeep and replacement costs, etc.

It is the main object of my invention to provide an individual roller bearing unit which can be utilized in the formation of complete roller rails.

Another object of my invention is the provision of an inexpensive roller rail composed of a plurality of individual roller bearing units which can easily and quickly be linked or otherwise secured together.

A further object of my invention is the provision of an individual roller unit composed of but two parts, to-wit: a bearing and a roller.

A further object of my invention is the provision of a roller rail composed of a plurality of loosely tied together, relatively movable roller bearing units.

Further objects of my invention will in part be obvious, and in part apparent from the following description of illustrative embodiments thereof.

In the drawing annexed hereto and made a part hereof,

Figure 1 is a plan view, partly in section, of a portion of a roller rail composed of a number of units constructed according to and embodying my said invention;

Fig. 2 is a side elevational view thereof, partly broken away to show the interior of the units;

Fig. 3 is a side elevational view, partly in section, of a portion of a roller rail composed of a number of units of modified form, also constructed according to and embodying my said invention; and Fig. 4 is in part a plan view, and in part a sectional view, along the broken line 4—4 of Fig. 3.

Fig. 5 is a reduced section on the line 5—5 of Fig. 2 showing a roller rail in position within a channel beam.

Each roller unit 10 is composed of a bearing member 12 and a roller 14, the roller 14 having journals 16, 16 formed as an integral part thereof, and both the bearing member and the roller being one-piece castings of heat and corrosion resisting alloy, preferably of nickel, chromium and iron composition. Bearing 12 has a longitudinal slot 18 formed in its upper wall and communicating within the hollow interior in member 12, in which roller 14 is received so as to project upwardly therefrom, and the bearing member also has a pair of opposed and spaced-apart, rounded, preferably tapered and open-sided bearing slots 20, 20 formed in the sidewalls thereof and extending transversely to slot 18, which slots 20, 20 are shaped to receive and provide bearings for the preferably tapered journals 16, 16 of roller 14.

My invention is not limited to any particular form of bearing, it being directed to the provision broadly of a plurality of tied-together individual unitary bearing members of any size and shape, connected together to form a rail in any convenient manner. For instance, as shown in Figs. 1 and 2, a plurality of bearing members 12 are placed in end-to-end relationship and secured in such relation. In this particular form of my invention, one end of each such bearing member 12 has an undercut portion 21 at each side, backed up by a pair of apertured lugs 22, 22. A pair of apertured lugs 24, 24 project from the other end of the adjacent bearing member and are received in the cut-out portion 21 of the next bearing member 12 in line, the apertures lining up with one another to receive a pin 25 passing therethrough for connecting the bearing members to one another. As shown, slotted apertures 26 may be formed in one pair of lugs, as in projecting lugs 24, 24, in order to permit and limit relative movement of the bearing members.

In this fashion, any number of bearing members 12 may be connected to form a roller rail of any desired or necessary length, and may be disposed within a furnace by placing same within a channel provided for the purposes as in the furnace floor, or as here shown in the channel of channel beam 40, the side walls 42 of which will keep the bearing members 12 from shifting out of usable line or relation under furnace operating conditions. While, if desired, the complete rail may be placed under tension to keep same in line and to reduce shifting, the loose connection between the bearing members 12 will permit same to expand and contract freely during use, and any individual member which fails can be replaced easily, quickly and with relatively little expense, since it is obvious that the castings may be produced in quantity at low unit cost. Any defective or cracked bearing member or bent or cracked roller may be removed and a new one replaced without the necessity for replacing an entire rail.

The bearing members 12 are cored at the bottom, as at 44, to allow scale to fall to the bottom thereof, sufficient clearance being provided between the roller and the bottom of the bearing member to prevent any clogging.

In Figs. 3 and 4 I have illustrated a modified form of bearing connection. In this form, the bearing member 50 is also a hollow one-piece casting of heat and corrosion resisting alloy having a longitudinal roller slot 52 formed therein, through which roller 54 projects, and a pair of rounded, preferably tapered and open-sided bearing slots 56, 56, extending transversely to roller slot 52, which slots 56, 56 are shaped to receive and provide bearings for the preferably tapered journals 58, 58 formed as an integral part of the one-piece cast roller 60.

One end wall of hollow bearing member 50 has an opening 62 formed in the bottom thereof. The other end of the bearing member has an upturned hook portion 64 cast thereon near the bottom and formed with a neck portion 65 adapted to be received in the opening 62 of an adjacent bearing member. When a number of bearings 50 are placed in the end-to-end relationship of Figs. 3 and 4, with hooks 64 on the end of one member engaged through the openings 62 of the adjacent member, preferably with some clearance to permit relative movement as shown, a loosely tied-together roller rail is formed, as seen in Fig. 3.

The forms shown herein are merely illustrative, and it is obvious that various modifications may be resorted to without departing from the scope of my invention, which is to be limited only by the annexed claims.

I claim:

1. A roller rail for use in heat-treating furnaces which comprises a plurality of individual one-piece roller bearing members, each of which bearing members comprises a hollow, one-piece member having front, back and a pair of side walls, a roller slot in the top of each of said members extending lengthwise thereof, a pair of aligned roller bearing slots in the side walls of each member transverse to the roller slot, adapted to receive a single roller therein, the lower portion of the roller extending into the interior of the hollow bearing and the upper portion of the roller extending upwardly of the bearing, said bearing members having a recess therein in the back wall of each thereof and a projection from the front wall formed as an integral part thereof, the said bearing members being disposed in end-to-end relationship so that the projection from the front wall of one bearing fits into the opening in the rear wall of the adjacent bearing.

2. A roller rail comprising a plurality of individual bearing members disposed in end-to-end relationship as in claim 1, one end of each member having recesses in its sides with apertured lugs therebetween, the other end having apertured projecting lugs therefrom, the members being disposed so that the projecting lugs of one member are received within the recesses of the adjacent member, and secured in such position by a pin passing through both the registering apertures of the respective lugs.

3. A roller rail comprising a plurality of individual bearing members disposed in end-to-end relationship as in claim 1, one end of each member having an opening near the bottom thereof, the other end having a projecting neck with an upturned hook on the end thereof, the members being so disposed that the hook on one end of each member is received within the opening of the adjacent member whereby the bearing members are secured in end-to-end relationship.

HENRY H. HARRIS.